US006409779B2

(12) United States Patent
Leinemann

(10) Patent No.: US 6,409,779 B2
(45) Date of Patent: Jun. 25, 2002

(54) METHOD FOR RENDERING A DETONATION FRONT HARMLESS

(75) Inventor: Christoph Leinemann, Braunschweig (DE)

(73) Assignee: Leinemann GmbH & Co., Braunschweig (DE)

( * ) Notice: Subject to any disclaimer, the term of this patent is extended or adjusted under 35 U.S.C. 154(b) by 0 days.

(21) Appl. No.: 09/756,915

(22) Filed: Jan. 10, 2001

Related U.S. Application Data

(62) Division of application No. 09/296,405, filed on Apr. 23, 1999, now Pat. No. 6,342,082.

(30) Foreign Application Priority Data

Apr. 25, 1998 (DE) ........................................ 198 18 572

(51) Int. Cl.[7] .............................. G05B 9/00; F17D 3/00
(52) U.S. Cl. .......................................... 48/192; 422/117
(58) Field of Search ................................. 422/117, 127; 431/1, 202, 246; 48/192

(56) References Cited

U.S. PATENT DOCUMENTS

| | | | |
|---|---|---|---|
| 1,681,698 | A | 8/1928 | Brooks |
| 2,810,631 | A | 10/1957 | Kanenbley |
| 3,780,772 | A | 12/1973 | Carnanhan et al. |
| 5,145,360 | A | 9/1992 | Rajewski |
| 5,905,227 | A | 5/1999 | Eichert et al. |

FOREIGN PATENT DOCUMENTS

| | | |
|---|---|---|
| DE | 1192982 | 6/1971 |
| DE | 19536292 C2 | 9/1995 |

*Primary Examiner*—Jerry D. Johnson
*Assistant Examiner*—Alexa A. Doroshenk
(74) *Attorney, Agent, or Firm*—Whitham, Curtis & Christofferson, PC

(57) ABSTRACT

A method for rendering a detonation front harmless. The method includes a pipe extending into a housing and proximate to the flame arresting device. The detonation front is conveyed directly to a portion of the flame-arresting device. The detonation front is expanded in front of the arresting device so as to create a deflagration, which then impinges on the outer cross-section of the flame arresting device.

7 Claims, 10 Drawing Sheets

METHOD FOR RENDERING A DETONATION FRONT HARMLESS

CROSS-REFERENCE TO RELATED APPLICATIONS

This application is a divisional of U.S. patent application Ser. No. 09/296,405 filed Apr. 23, 1999, now U.S. Pat. No. 6,342,082 and the complete contents of that application is herein incorporated by reference.

BACKGROUND OF THE INVENTION

1. Field of the Invention

The present invention generally relates to a method and apparatus for rendering harmless a detonation front traveling in a pipeline and, more particularly, to a detonation safety device having a flame-arresting device that hinders the transmission of the detonation flame.

2. Background Description

The propagation of an explosion in a flammable gas mixture in a container and/or pipeline system can occur as detonation or as deflagration. In the case of detonation, the flame front and the shock front created by the pressure wave of the explosion are superimposed such that flame propagation velocities may reach several thousand meters/second (m/s) and combustion pressures in the shock direction may reach upwards of 100 bars. In the case of deflagration, the shock waves precede the flame front such that flame propagation velocities of deflagration are in the order of several hundred m/s and the combustion pressures in the shock direction are upwards of 10 bars (with an original pressure of the mixture of one bar).

Several methods are known to avoid the destructive effects of detonations. These methods attempt to weaken and/or end the detonation, preferably by transforming the detonation into a deflagration prior to arrival at a flame-arresting device. In many instances, the flame-arresting device is combined with “etonation brakes” and/or “detonation shock catchers” (e.g., detonation absorbers), and further includes a number of long and narrow slots. These long and narrow slots attempt to cool the flame until the flame becomes extinct.

By way of example, DE-PS 1192 980 (German patent) describes a detonation safety device consisting of a detonation brake and a flame arresting device. In this device, a detonation front propagating in a pipeline is split by a convex outer surface of a cylindrical wall and reaches an expansion space that has a volume comparatively greater than the pipeline. A second semicircular cylindrical wall of a smaller diameter than the cylindrical wall is provided such that two facing free wall parts of the cylindrical wall and the second semicircular cylindrical wall are overlapped, thereby forming a labyrinth of various turns. In order to extinguish the detonation, the split detonation front travels through the labyrinth until it reaches the flame-arresting device. The flame-arresting device is placed in an exit housing and angled at 90 degrees to the pipeline in which the detonation initially propagated.

However, in these known devices as described with reference to DE-PS 1192 980, the split detonation fronts create a secondary detonation, especially under unfavorable mixture composition conditions. It is thus necessary to size the flame-arresting device in such a way that it performs the flame extinguishing function even in the secondary detonation case. In order to accomplish the flame extinguishing function, the flame extinguishing slots of the arresting device must be adequately long and narrow so as to realize a relatively high pressure loss during normal pipeline operation. However, these long and narrow slots require high maintenance which can be costly and time consuming.

By way of further example, DE 195 36 292 C2 teaches a split of the detonation front into a main front and a secondary front. In the case of DE 195 36 292 C2, the main front is conducted into the expansion space with a longer transit time so that upon entry into the expansion space the main front contains combustion gases of the secondary front. It is noted, however, that the splitting of the detonation into main and secondary fronts such that the main front needs a longer transit time to reach the expansion space also requires many turns which thus results in a minimum volume for the detonation safety device. Thus, there is a need to use a pre-installed shock buffer for at least the main front. It is noted, however, that the use of the shock buffer results in a relatively high fabrication cost especially when the detonation safety device is impacted by detonation fronts from both sides in which case the shock buffers must be installed on both sides of the flame-arresting device.

In principle, it would be possible to use a flame-arresting device without a shock buffer. However, the slots of the arresting device must be quite long and narrow in order to achieve adequate safety, resulting in high pressure losses across the arresting device. If flame arresting devices with low pressure drop are used, the flame front entering the arresting device can push lighter non-combusted mixtures through the arresting device which would thus result in higher stream velocities and the creation of turbulence in the flame extinguishing slots in the flame front travel direction. The higher stream velocities would thus increase the combustion velocity and reduce the extinction capability and the flame arresting safety of the device. It is further known that if the arresting devices with high damming capability created by long and narrow slots are used to provide high flame arresting safety, significant operational drawbacks of high pressure losses will result in the arresting devices.

SUMMARY OF THE INVENTION

It is therefore an object of the present invention to provide a detonation safety device which is built with simple and inexpensive components.

It is a further object of the present invention to provide a detonation safety device which does not have large pressure drops.

It is still a further object of the present invention to provide a detonation safety device which provides a high degree of flame arresting safety.

It is another object of the present invention to provide a detonation safety device which does not use a shock buffer.

According to the invention, there is provided a detonation safety device which renders harmless a detonation front traveling in a pipeline by the use of a flame-arresting device. The detonation safety device includes a housing built into a pipeline and/or container system having a specific diameter. The flame-arresting device is housed in the housing and hinders the detonation of the flame of the detonation front.

The diameter of the flame-arresting device is significantly larger than the pipe diameter thus providing a desired low pressure drop. Since the diameter of the flame-arresting device is larger that the pipeline diameter, it is appropriate to convey the detonation front as several part-fronts to various parts of the flame arresting device. This arrangement also allows an even distribution of flowing gases over the comparatively large surface area of the arresting device during normal operations.

A pipe stub extends from the pipe and into the housing. The outlet of the pipe stub is proximate to the flame-arresting device and creates an open space so that a detonation front traveling through the pipe stub impinges only on a portion of the flame-arresting device. The pipe stub is placed near the flame-arresting device such that the portion being impinged by the front is essentially equal to the pipeline diameter. The flame-extinguishing operating mode becomes more effective as the end of the pipe stub is placed closer to the flame-arresting device.

The pipe stub may also include small (relative to the pipe diameter) connection openings between the pipe stub and the surrounding open space which causes pre-combustion of the detonation front in the expansion space. The pre-combusted gases avoid the tendency of a renewed detonation front in the expansion space, especially one caused by a reflection off the end wall of the expansion space furthest away from the arresting device. In this way, the length of the expansion space can be reduced. In still further embodiments of the present invention, several pipe stubs are provided, where each of the pipe stubs have a smaller diameter than the diameter of the pipeline.

Preferably, the flame-arresting device has a total diameter of at least double the front impingement diameter so that low pressure drops are achieved during normal operations. A lower limit for the reduction of the gap between the end of the pipe stub and the flame-arresting device results from the need that, during normal operations, the total cross-section of the flame-arresting device be uniformly impinged at the usual, normally relatively low, flow velocities. Within the limits of these boundary conditions, the distance between the outlet of the pipe stub and the flame-arresting device is equal to or larger than one third of the pipe diameter and equal to or smaller than the pipe diameter.

The detonation front is expanded before reaching the flame-arresting device in such a manner that a deflagration ensues and impinges on the outer cross-section of the flame-arresting device. In the embodiments of the present invention, a small portion of the detonation front is diverted to an expansion space for pre-burning so that pre-combusted gases can prevent a renewed formation of a detonation front in the expansion space.

By using the configuration of the present invention, the detonation safety device of the present invention may be used without a shock buffer.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
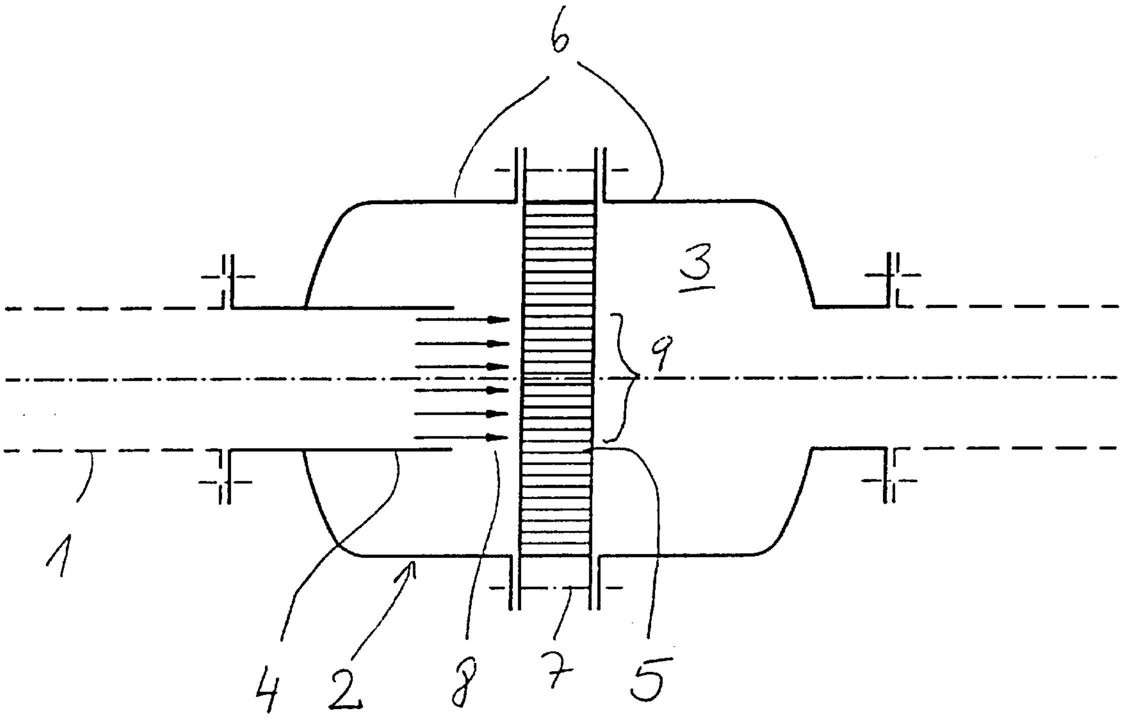
FIG. 1 shows a flame-arresting device of the present invention.

Referring now to the drawings, and more particularly to FIG. 1, there is shown a detonation safety device of the present invention. The detonation safety device includes a housing 2 which is inserted into a pipeline 1. The housing 2 is flanged at both ends to the pipeline 1 thereby creating an inner space 3 of the housing 2. The preferred shape of the housing 2 is cylindrical with a cross-section approximately equal to that of the flame-arresting device 5.

A pipe stub 4 extends from one end of the pipeline 1 into the inner space 3, and extends to a flame-arresting device 5 mounted concentrically with the housing 2. In the preferred embodiment, the flame-arresting device 5 is mounted between two halves 6 of the housing 2 and is secured by flange connections 7.

FIG. 1 further shows a detonation front 8 traveling through the pipe stub 4 and impinging upon a portion 9 of the flame arresting device 5. The flame-arresting device 5 includes a diameter larger than the pipe and the detonation front such that the detonation front impinges only on a partial surface (e.g., portion 9) of the flame-arresting device 5. Preferably, the flame-arresting device 5 has a total diameter of at least double the front impingement diameter so that low pressure drops are achieved during normal operations.

Figure 2:
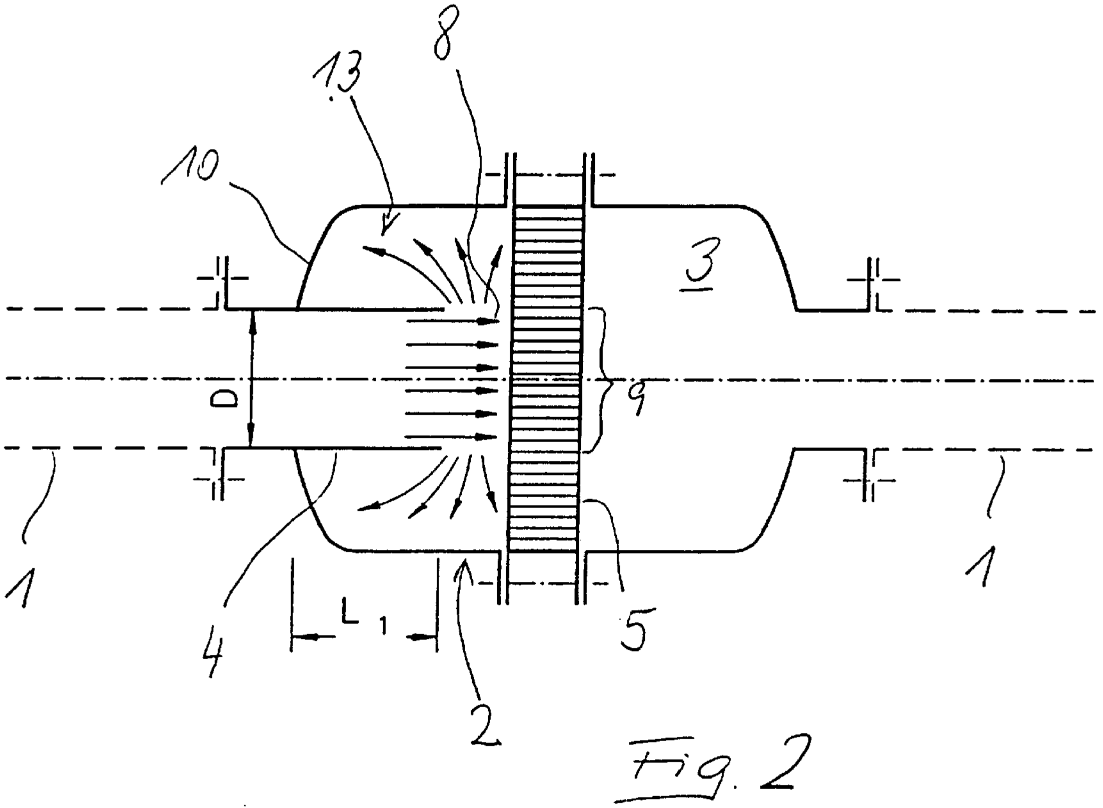
FIG. 2 shows an expansion of a deflagration front initiated by secondary ignition by the detonation front.

FIG. 2 shows an expansion of a deflagration front initiated by secondary ignition by the detonation front. Specifically, the detonation front impinges on the partial surface of the flame-arresting device 5 and then expands in front of the arresting device 5 so as to create a deflagration. The deflagration then impinges on the outer cross-section of the flame arresting device.

FIG. 2 also shows that the pipe stub 4 includes a diameter D, and that the detonation front 8 impinges only on a portion 9 of the flame arresting device 5 (substantially equal to the diameter D of the pipeline 1). The diameter of the portion 9 of the flame arresting device 5 is approximately equal to the diameter D of the pipeline 1. The detonation front which impinges upon only the portion 9 of the flame-arresting device 5 is subject to high flow resistance. This can be further reinforced by constructing the flame-arresting device 5 so that the impingement section (e.g., portion 9) is different from the peripheral sections of the flame-arresting device 5.

As seen further in FIG. 2, the shock wave of detonation front 8 encounters a relatively high flow resistance at the flame arresting device 5 due to the small diameter D. Thus, the detonation front 8 is partially reflected by the flame-arresting device 5 and is brought to extinction upon entering the portion 9 of the flame-arresting device 5. The detonation front 8 also creates a secondary ignition in the expansion space 13 of the housing 6 located in the open area between the end of the pipe stub 4 and the flame-arresting device 5. The expansion space 13 extends for a distance L1 between the outlet of the pipe stub 4 to an end wall 10 of the housing 6.

The secondary ignition of FIG. 2 creates a deflagration in the expansion space 13. This deflagration further impinges on the outer periphery portions of the flame-arresting device 5 which significantly lowers the flame propagation velocity and combustion pressure. The deflagration reflections from the walls of the expansion space 13, especially the end wall 10 surrounding the pipe stub 4, could again initiate a detonation front. However, by using an adequate minimum length L1, the detonation front is eliminated since the reflected deflagration front transformed into a detonation front encounters an already combusted gas mixture in front of the flame-arresting device 5. Thus, the detonation front is rendered harmless.

In the preferred embodiment, length L1 is larger or equal to 0.5 D and smaller or equal to 2D and more preferably equal to 0.6 D of the pipeline 1; however, other appropriate lengths may equally be used depending on the pressure drop across the arresting device 5. It is noted that when pre-combustion occurs, the length L1 may be reduced to one half of the pipeline diameter D.

The detonation front is allowed to impinge only on a portion of the flame-arresting device 5 by conducting the detonation front very close to the flame-arresting device 5 by use of the pipe stub 4. Thus, an expansion space is created on the inlet side of the flame-arresting device 5 which permits the detonation front to generate a deflagration, by secondary combustion. Since the flame-arresting device 5 is impinged by the detonation front only on a part of the flame-arresting device 5 surface it offers very high flow resistance. The free cross-section surface of the whole flame-arresting device 5 is preferably equal or greater than the pipe diameter D of the pipeline 1.

Figure 3:
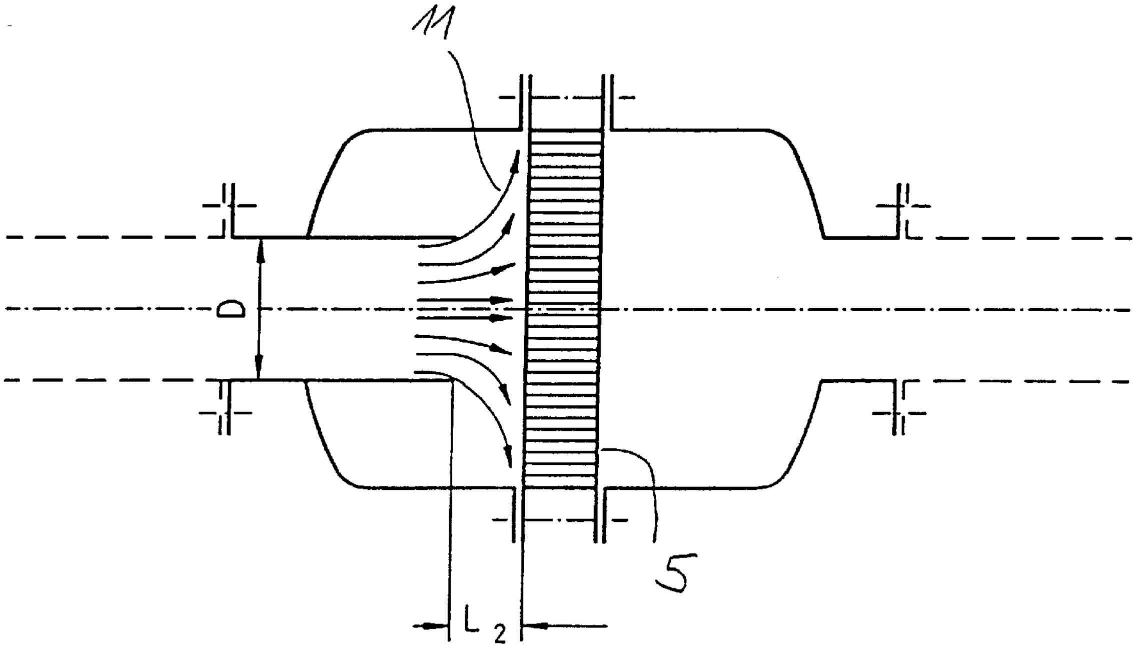
FIG. 3 shows the flame-arresting device of the present invention under normal operating conditions.

Referring now to FIG. 3, the cross-section of the flame-arresting device 5 is either equal to or larger than the cross-section area of pipe stub 4 (diameter D) so that normal gas flow 11, rather than the detonation front 8, does not cause any significant pressure loss across the flame-arresting device 5. FIG. 3 further shows the open distance L2 between the outlet end of the pipe stub 4 and the flame-arresting device 5 surface. The distance L2 is chosen such that under normal operation conditions the flame- arresting device 5 is uniformly impinged by the flowing medium over the entire surface area of the flame-arresting device 5. This takes place when L2 is larger or equal to one third of diameter D and smaller or equal to than diameter D. However, it is further understood that the distance L2 may obtain an optimal length depending on the pressure drop across the arresting device 5.

Figure 4:
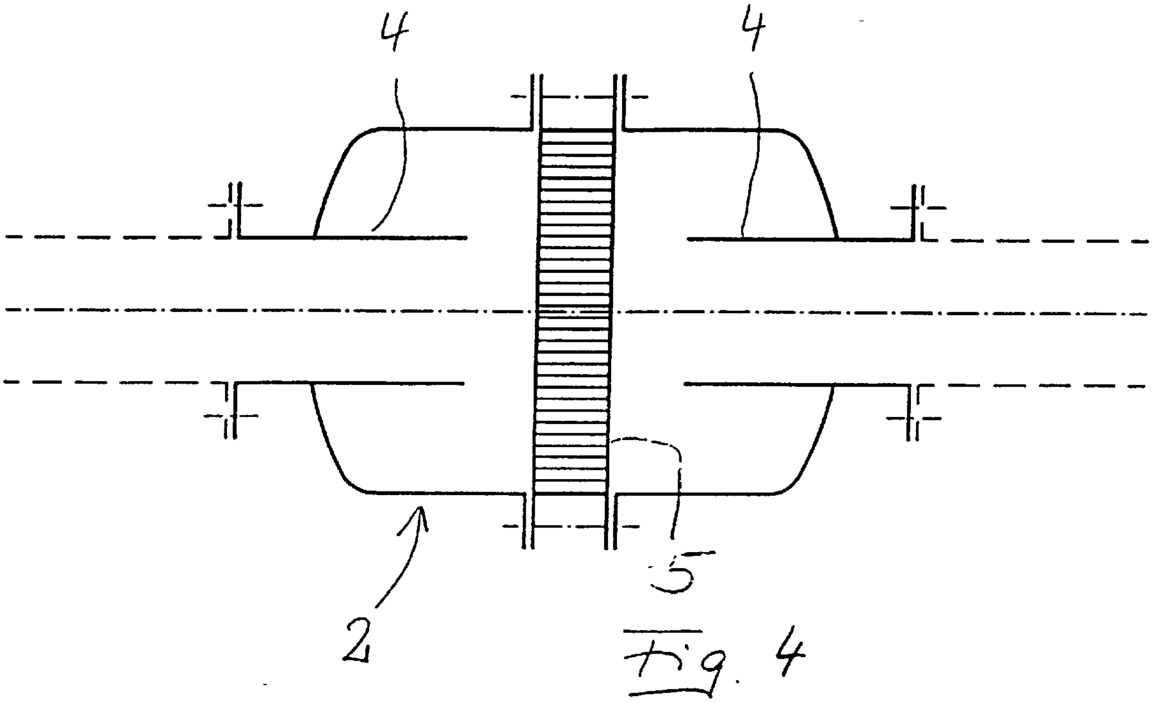
FIG. 4 shows the flame-arresting device of the present invention with detonation fronts in both flow directions.

FIG. 4 shows the flame-arresting device 5 of the present invention with detonation fronts in both flow directions. Specifically, FIG. 4 shows the pipe stub 4 provided on both sides of flame arresting device 5. Thus, the detonation safety device of FIG. 4 may be used for detonation fronts 8 traveling in either direction.

Figure 5:
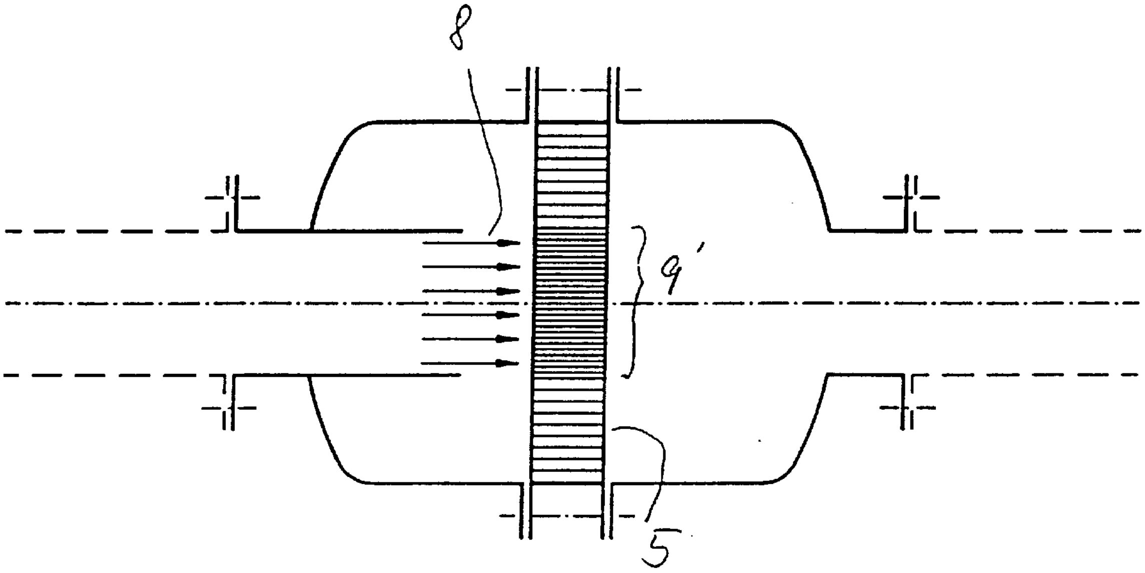
FIG. 5 shows the flame-arresting device of FIG. 1 with narrow slots.

FIG. 5 shows the flame-arresting device 5 with narrow slots 9' about the center thereof and substantially directly in the path of the detonation front. The narrow slots 9' of the flame-arresting device 5 provides a higher flow resistance to the detonation front 8 as compared to the slots of FIG. 1. It is advantageous for the slots 9' in the impingement area to be narrower, while for reason of manufacturing the slot lengths of all of the slots are uniform over the whole flame-arresting device 5 cross-section.

Figure 6:
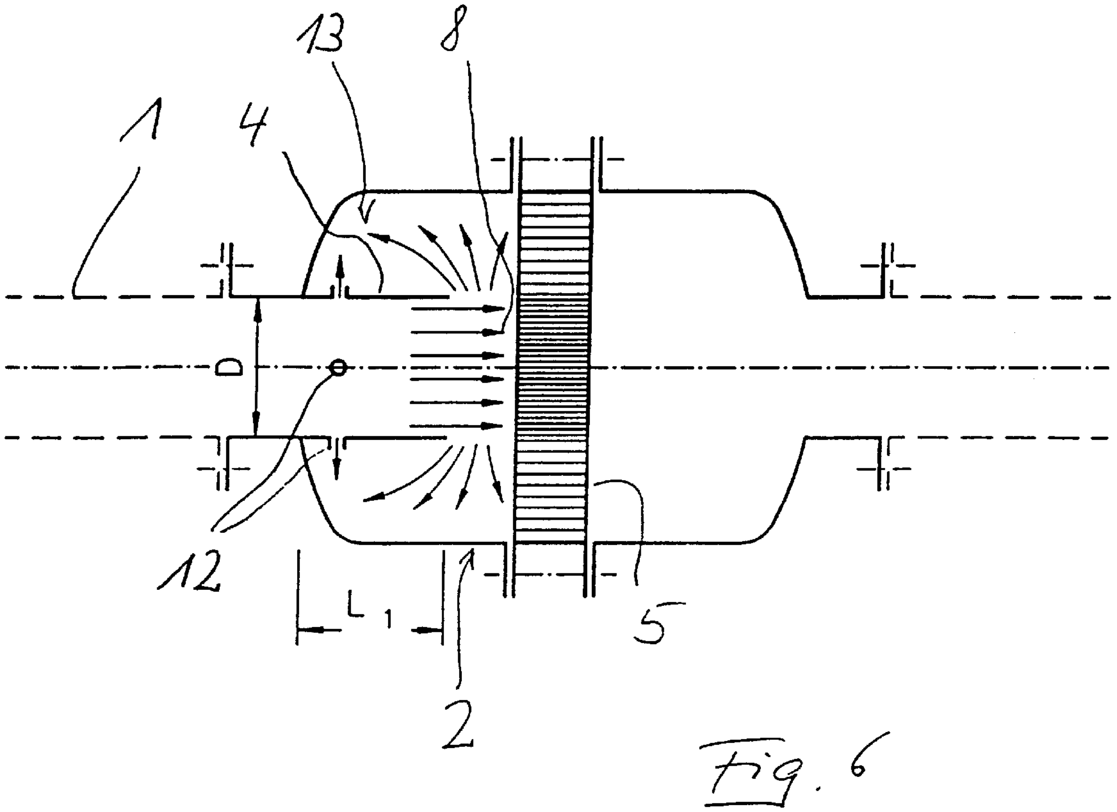
FIG. 6 shows the flame-arresting device of FIG. 1 with openings on a pipe.

Referring now to FIG. 6, the pipe stub 4 is provided with small connection openings 12 that divert a portion of the entering detonation front 8 immediately after the beginning of housing 2. The connection openings 12 transfer the detonation front 8 directly into the expansion space 13 which causes pre-combustion of the detonation front in the expansion space 13. The burnt gases in the expansion space 13 hinder the generation of a secondary detonation by reflection of a deflagration off the end wall 10 of the housing 2 which results in a reduction in the length L1.

Figure 7:
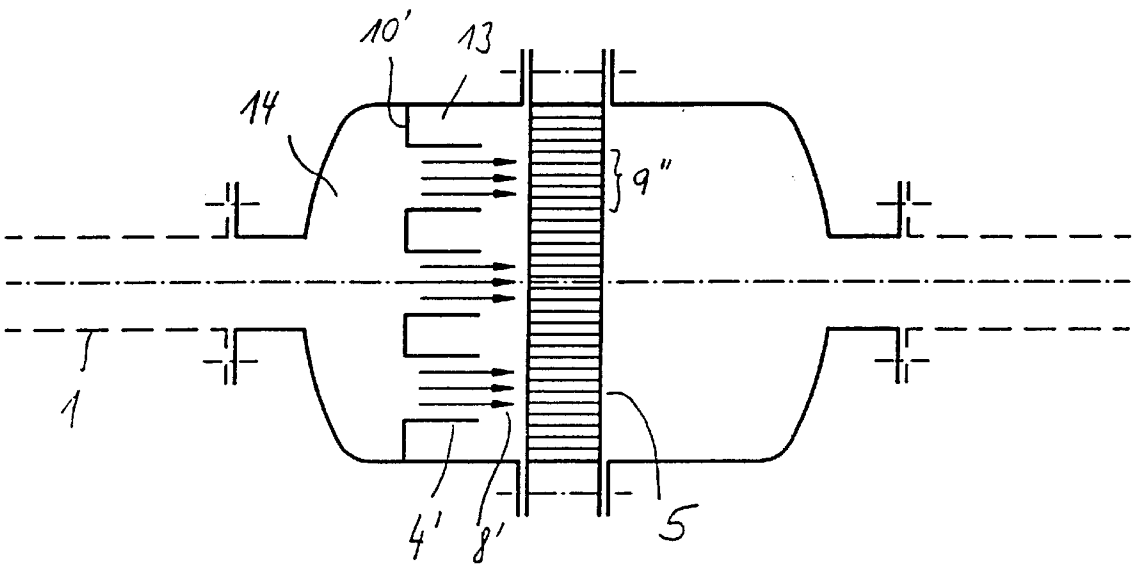
FIG. 7 shows the flame-arresting device of FIG. 1 with several pipe stubs of smaller diameter.

FIGS. 7 shows several pipe stubs 4' each having a smaller diameters than diameter D (as shown in FIG. 1) of the pipeline 1. The arrangement of the pipe stubs 4' shown in FIG. 7 includes a central stub 4' aligned with the pipeline 1 but having a slightly smaller diameter D than that of the pipeline 1. Four additional pipe stubs 4' are placed radially from the central stub 4' at equal distances from each other. As seen in FIG. 7, the flame-arresting device 5 is extremely large in relation to the diameter of the pipe stubs 4' which allows the flame-arresting device 5 to obtain a very low pressure loss through during normal operation. It is further noted that the effective gap length L2 is maintained and that a uniform distribution of the flowing medium on the flame-arresting device 5 during normal operation is obtain when the several pipe stubs 4' are installed opposite the cross-section of the flame-arresting device 5.

Figure 8:
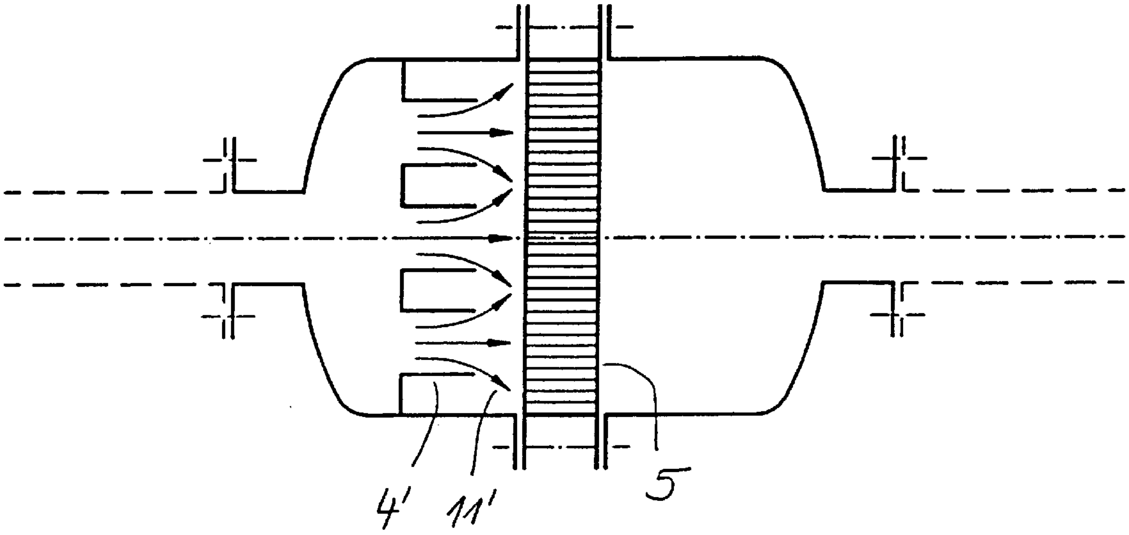
FIG. 8 shows the flame-arresting device of the present invention under normal operating conditions according to FIG. 7.

Still referring to FIG. 7, the detonation front 8 traveling through the pipeline 1 is split into several partial detonation fronts 8' that impinge on the corresponding portions 9" of the flame-arresting device 5. Also, the back end-wall 10', limiting the length L1 of the expansion space 13, is formed by wall pieces that create a distribution space 14 in the flow direction in front of the flame-arresting device 5. This expansion space 13 spreads from the diameter D of the pipeline 1 to the effective diameter of the flame-arresting device 5, and further includes the pipe stubs 4'. FIG. 8 shows the normal operation of the flame-arresting device 5 such that normal part-streams 11' pass through the stubs 4' and are distributed uniformly on the cross-section surface of the arresting device 5.

Figure 9:
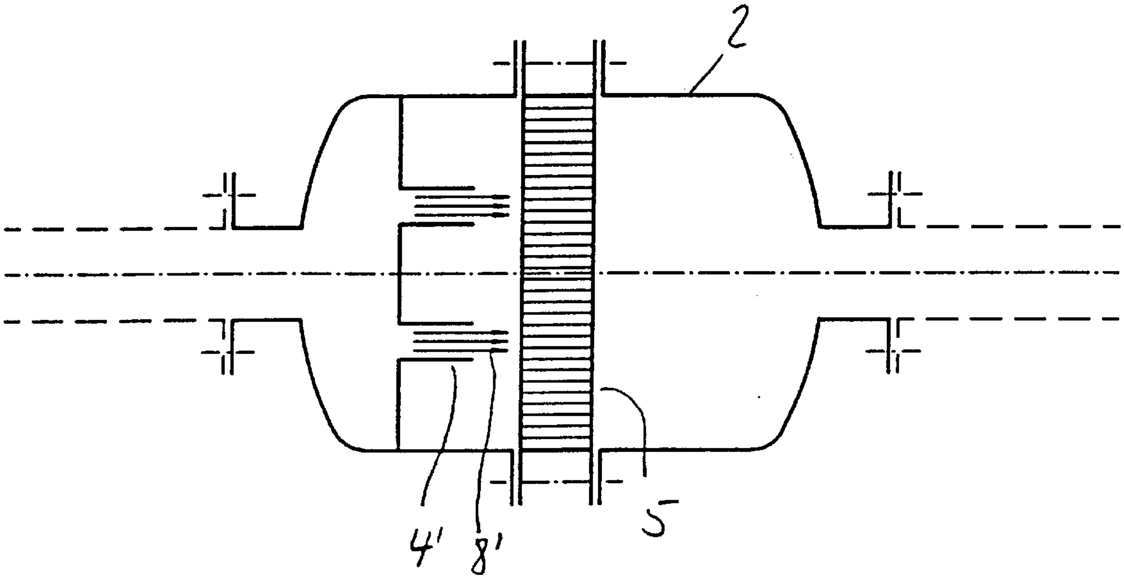
FIG. 9 shows the flame-arresting device of FIG. 1 with two pipe stubs of smaller diameter.
Figure 10:
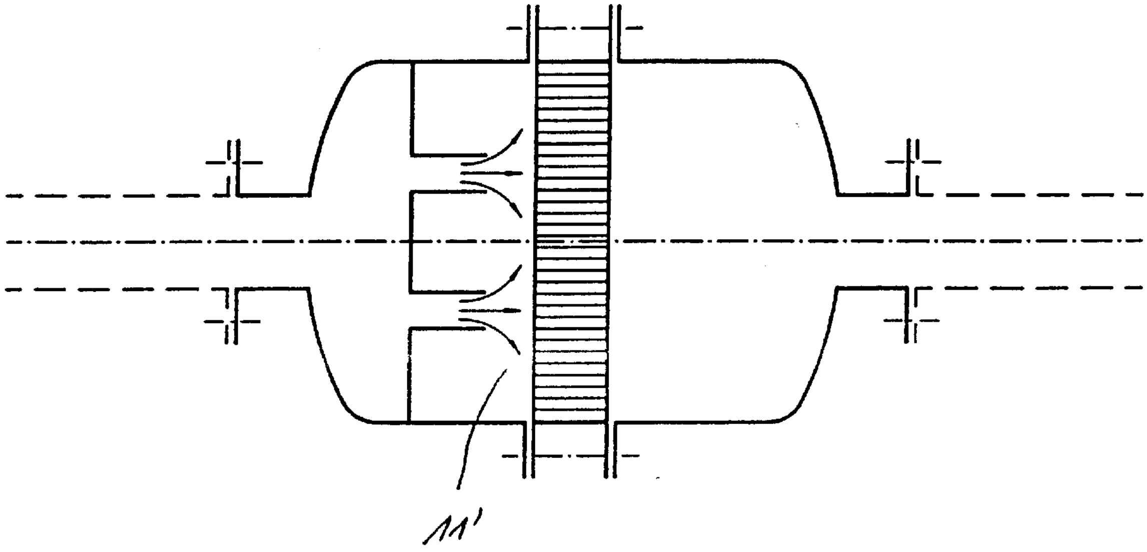
FIG. 10 shows the flame-arresting device of the present invention under normal operating conditions according to FIG. 9.

FIG. 9 shows two pipe stubs 4' which are placed equidistant from the center axis of the housing 2 and/or the flame-arresting device 5. This arrangement also leads to partial detonation fronts 8' of FIG. 9 and/or normal part-flows as shown in FIG. 10.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for rendering harmless a detonation front flowing in a pipeline using a flame-arresting device having a diameter larger than a diameter of the pipeline, the method including the steps of:

providing a pipe stub proximate to the flame-arresting device;

conveying, via the pipe stub, the detonation front to a portion of the flame-arresting device having a diameter substantially equal to the detonation front, the diameter of the detonation front being substantially equal to a diameter of the pipe stub;

permitting the detonation front to impinge on the portion of the flame-arresting device;

permitting the detonation front to expand in front of the flame-arresting device.

2. The method of claim 1, further including diverting the expanded detonation front into an expansion space for pre-combustion.

3. The method of claim 1, wherein, in the conveying step, the detonation front is conveyed to several portions of the flame-arresting device by separating the detonation front into part-detonation fronts.

4. The method of claim 1, further including:

providing two or more pipe stubs proximate to the flame-arresting device; and the conveying step further conveying the detonation front to a portion of the flame-arresting device via the two or more pipe stubs.

5. The method of claim 1, further including diverting a portion of the detonation front through at least one connection opening in the pipe stub into an expansion space, and combined with the expanded detonation front, for pre-combustion.

6. The method of claim 1, further including providing a distance between an outlet of the pipe stub and the flame-arresting device equal to or smaller than the diameter of the pipeline.

7. The method of claim 1, further including providing slots on the flame-arresting device narrower on the impingement portion of the flame-arresting device than on the periphery portions of the flame-arresting device.

* * * * *